United States Patent
Zwicky et al.

(10) Patent No.: US 10,409,286 B2
(45) Date of Patent: Sep. 10, 2019

(54) HIGHWAY DETECTION SYSTEMS AND METHODS

(71) Applicant: Ford Global Technologies, LLC, Dearborn, MI (US)

(72) Inventors: Timothy D Zwicky, Dearborn, MI (US); Kyle J Carey, Ypsilanti, MI (US); Surjya Sarathi Ray, San Jose, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 74 days.

(21) Appl. No.: 15/656,664

(22) Filed: Jul. 21, 2017

(65) Prior Publication Data
US 2019/0025840 A1 Jan. 24, 2019

(51) Int. Cl.
G05D 1/02 (2006.01)
G08G 1/0962 (2006.01)
G08G 1/0967 (2006.01)
G08G 1/16 (2006.01)

(52) U.S. Cl.
CPC ......... G05D 1/0221 (2013.01); G05D 1/0246 (2013.01); G05D 1/0257 (2013.01); G08G 1/09626 (2013.01); G08G 1/096725 (2013.01); G08G 1/16 (2013.01)

(58) Field of Classification Search
CPC .. G05D 1/0221; G05D 1/0246; G05D 1/0257; G08G 1/09626; G08G 1/096725; G08G 1/16
See application file for complete search history.

(56) References Cited

U.S. PATENT DOCUMENTS

| | | | | |
|---|---|---|---|---|
| 6,131,064 A | * | 10/2000 | Vieweg | G08G 1/0112 340/905 |
| 8,537,338 B1 | * | 9/2013 | Medasani | G01C 21/32 356/4.01 |
| 8,823,556 B2 | | 9/2014 | Yester | |
| 8,949,016 B1 | * | 2/2015 | Ferguson | B60W 30/00 340/436 |
| 9,120,484 B1 | * | 9/2015 | Ferguson | G01S 17/936 |
| 9,342,074 B2 | | 5/2016 | Dolgov | |
| 9,489,584 B2 | | 11/2016 | Osanai | |
| 9,495,874 B1 | * | 11/2016 | Zhu | G06N 20/00 |

(Continued)

FOREIGN PATENT DOCUMENTS

| | | |
|---|---|---|
| DE | 102013009422 A1 | 12/2014 |
| DE | 102015006569 A1 | 12/2015 |

OTHER PUBLICATIONS

Road Type Classification through Data Mining.

*Primary Examiner* — Mussa A Shaawat
(74) *Attorney, Agent, or Firm* — David R. Stevens; Stevens Law Group

(57) ABSTRACT

Example highway detection systems and methods are described. In one implementation, a method receives data from a vehicle data bus in a first vehicle and detects a speed of the first vehicle based on the received data. The method also determines a speed of an oncoming vehicle and a lateral distance between the first vehicle and the oncoming vehicle based on the received data. One or more processors determine whether the first vehicle is driving on a highway based on the speed of the first vehicle, the speed of the oncoming vehicle, and the lateral distance between the first vehicle and the oncoming vehicle.

20 Claims, 7 Drawing Sheets

(56) References Cited

U.S. PATENT DOCUMENTS

| | | | |
|---|---|---|---|
| 2007/0021915 A1* | 1/2007 | Breed | B60N 2/2863 |
| | | | 701/301 |
| 2008/0167819 A1* | 7/2008 | Breed | G08G 1/161 |
| | | | 701/300 |
| 2008/0167821 A1* | 7/2008 | Breed | G08G 1/161 |
| | | | 701/301 |
| 2009/0048750 A1* | 2/2009 | Breed | G08G 1/161 |
| | | | 701/70 |
| 2011/0071801 A1* | 3/2011 | Carrasco | G06F 17/5004 |
| | | | 703/1 |
| 2012/0056756 A1* | 3/2012 | Yester | G08G 1/07 |
| | | | 340/901 |
| 2014/0156133 A1* | 6/2014 | Cullinane | B60W 30/00 |
| | | | 701/23 |
| 2014/0160252 A1* | 6/2014 | Randler | G06K 9/00805 |
| | | | 348/47 |
| 2015/0149023 A1* | 5/2015 | Attard | B60W 30/182 |
| | | | 701/28 |
| 2015/0166069 A1* | 6/2015 | Engelman | B60W 30/12 |
| | | | 701/23 |
| 2015/0177007 A1* | 6/2015 | Su | G01C 21/34 |
| | | | 701/25 |
| 2017/0008561 A1 | 1/2017 | Kinugasa et al. | |
| 2017/0297571 A1* | 10/2017 | Sorstedt | B60W 50/14 |
| 2017/0356746 A1* | 12/2017 | Iagnemma | G05D 1/0088 |
| 2018/0056995 A1* | 3/2018 | Deng | B62D 15/025 |
| 2018/0113200 A1* | 4/2018 | Steinberg | G01S 7/497 |
| 2018/0194280 A1* | 7/2018 | Shibata | B60Q 9/00 |
| 2018/0224857 A1* | 8/2018 | Yang | G05D 1/0212 |
| 2018/0335781 A1* | 11/2018 | Chase | G05D 1/028 |

* cited by examiner

| Parameters | Description |
|---|---|
| $S^H$ | Speed of host vehicle, averaged over one $T$ |
| $S^O$ | Obstacle speed, averaged over one $T$ |
| $n_v$ | Number of vehicles detected by the camera around the host vehicle |
| $f_p$ | Flag which is set when pedestrian or bicycle is detected |
| $x_{center}$ | Lateral distance between the host vehicle and the radar track (Fig. 2) |

FIG. 5

| Parameters | Thresholds | Comments |
|---|---|---|
| $S^H$ | $(S^H)^{th}$ | Above the threshold, the value likely indicates a highway |
| $S^O$ | $(S^O)^{th}$ | Above the threshold, the value likely indicates a highway |
| $n_v$ | $(n_v)^{th}$ | Above the threshold, the value could mean lots of vehicles on a highway (example: traffic jam) |
| $x_{center}$ | $(x_{center})^{th}$ | Above the threshold, the value likely indicates a highway; below it, the value indicates the likelihood of a non-highway |

FIG. 6

HIGHWAY DETECTION SYSTEMS AND METHODS

TECHNICAL FIELD

The present disclosure relates to vehicular systems and, more particularly, to systems and methods that determine whether a vehicle is driving on a highway.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another.

In some embodiments, an autonomous vehicle, or a vehicle having a driving assistance system, may allow a driver to remove their hands from the steering wheel in certain situations. For example, determining whether a driver can remove their hands from the steering wheel may include evaluating the complexity of the current driving environment and determining whether the driving assistance system can safely steer the vehicle without driver involvement.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 5 illustrates an embodiment of example parameters used to determine whether a vehicle is driving on a highway.

FIG. 6 illustrates an embodiment of example threshold values used to determine whether a vehicle is driving on a highway.

DETAILED DESCRIPTION

Figure 1:
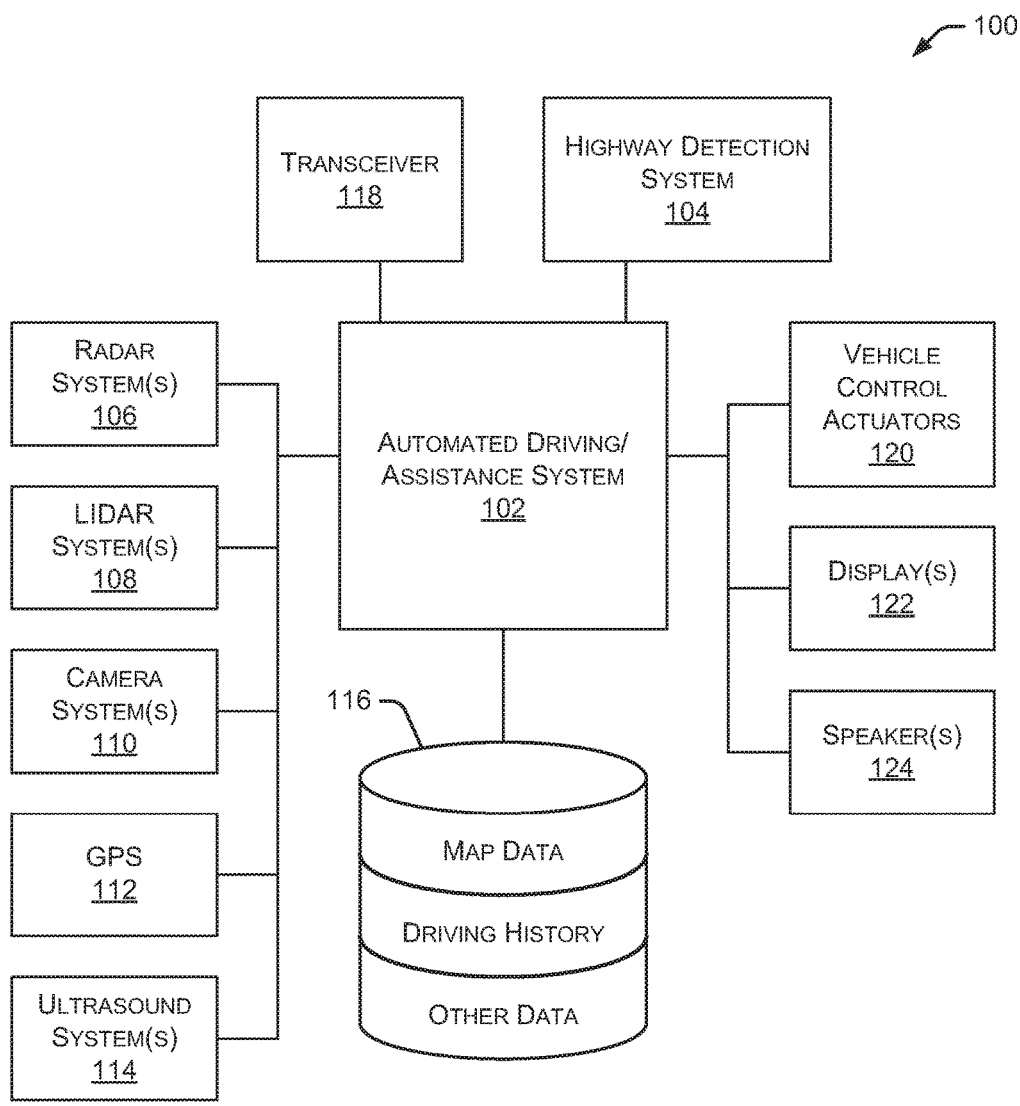
FIG. 1 is a block diagram illustrating an embodiment of a vehicle control system that includes a highway detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes a highway detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes highway detection system 104 that interacts with various components in the vehicle to determine whether a host vehicle is driving on a highway. As discussed herein, the host vehicle is the vehicle in which highway detection system 104 is operating. Additionally, highway detection system 104 may classify the type of road on which the host vehicle is driving. Although highway detection system 104 is shown as a separate component in FIG. 1, in alternate embodiments, highway detection system 104 may be incorporated into automated driving/assistance system 102 or any other vehicle component.

Vehicle control system 100 also includes one or more sensor systems/devices for detecting a presence of nearby objects (or obstacles) or determining a location of a parent vehicle (e.g., a vehicle that includes vehicle control system 100). The parent vehicle may also be referred to as a host vehicle. For example, vehicle control system 100 may include one or more Radar (Radio detection and ranging) systems 106, one or more Lidar (Light detection and ranging) systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. Lidar systems 108 may include one or more interior Lidar sensors that capture data associated with the area inside the vehicle. Vehicle control system 100 may include a data store 116 for storing relevant or useful data for navigation and safety, such as map data, driving history, or other data. Vehicle control system 100 may also include a transceiver 118 for wireless communication with a mobile or wireless network, other vehicles, infrastructure, or any other communication system.

Vehicle control system 100 may include vehicle control actuators 120 to control various aspects of the driving of the vehicle such as electric motors, switches or other actuators, to control braking, acceleration, steering, seat belt tension, door locks, or the like. Vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. Speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, automated driving/assistance system 102 is configured to control driving or navigation of a parent vehicle. For example, automated driving/assistance system 102 may control the vehicle control actuators 120 to drive a path on a road, parking lot, driveway or other location. For example, automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that automated driving/assistance system 102 can assist a driver or drive a vehicle in real-time.

Figure 2:
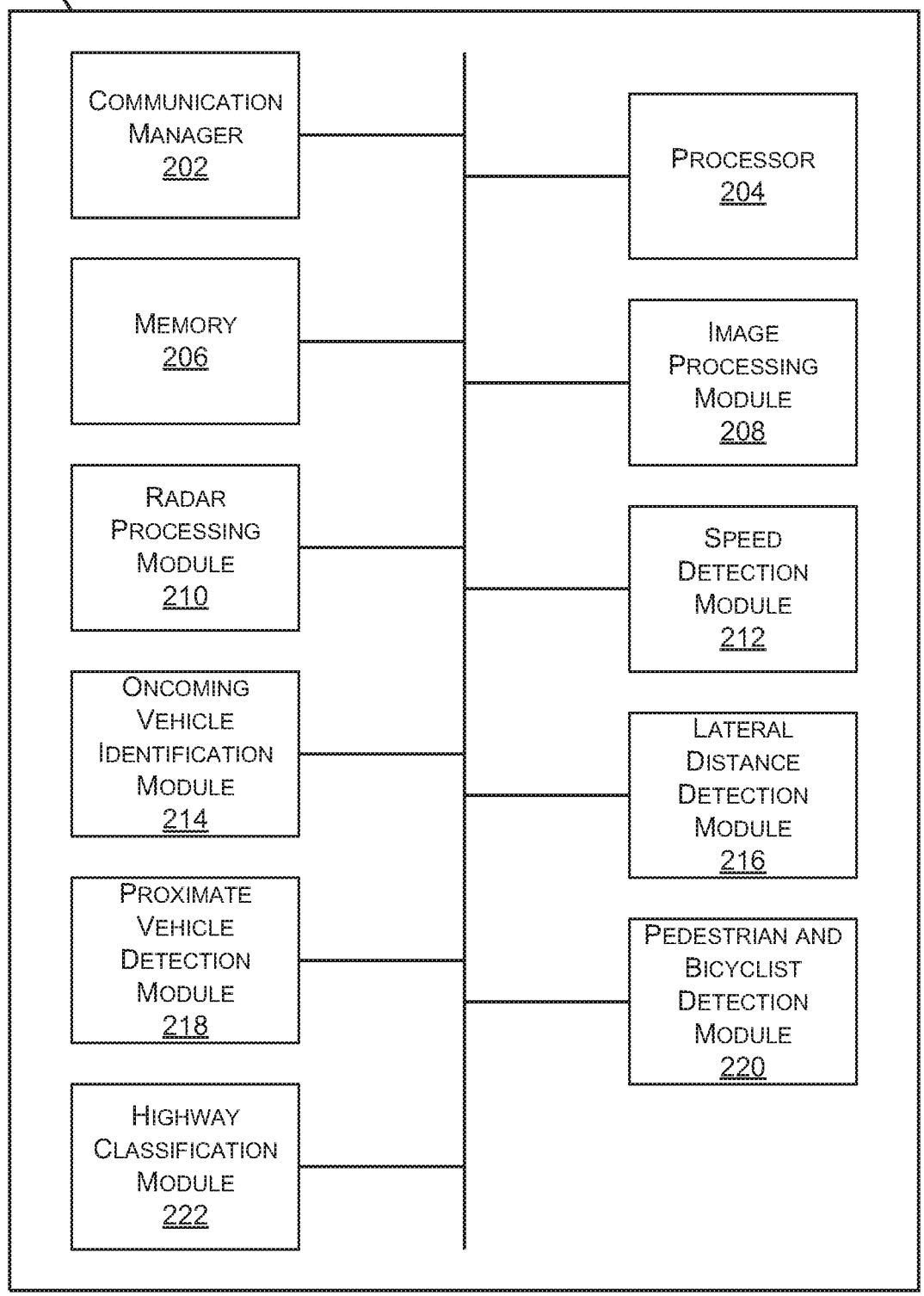
FIG. 2 is a block diagram illustrating an embodiment of a highway detection system.

FIG. 2 is a block diagram illustrating an embodiment of highway detection system 104. As shown in FIG. 2, highway detection system 104 includes a communication manager 202, a processor 204, and a memory 206. Communication manager 202 allows highway detection system 104 to communicate with other systems, such as automated driving/assistance system 102. Processor 204 executes various instructions to implement the functionality provided by highway detection system 104, as discussed herein. Memory 206 stores these instructions as well as other data used by processor 204 and other modules and components contained in highway detection system 104.

Additionally, highway detection system 104 includes an image processing module 208 that receives image data from one or more camera systems 110. In some embodiments, image processing module 208 analyzes image data from camera systems 110 to identify objects, such as pedestrians, bicyclists, and other vehicles near the host vehicle. For example, image processing module 208 may determine a number of vehicles located near the host vehicle (e.g., proximate the host vehicle) and may identify oncoming vehicles that are approaching the host vehicle in an oncoming lane of traffic. In some embodiments, image processing module 208 monitors the movement of objects and other vehicles over a period of time to determine a speed associated with the objects and other vehicles.

A radar processing module 210 receives radar data from one or more radar systems 106 to identify, for example, other vehicles, pedestrians, bicyclists, and other objects near the host vehicle. In some embodiments, radar processing module 210 detects the speed of the host vehicle and the speed of one or more oncoming vehicles. In some implementations, radar processing module 210 also assists with the determination of a lateral distance between the host vehicle and an oncoming vehicle.

Highway detection module 104 also includes a speed detection module 212 that is capable of determining a speed of the host vehicle. In some embodiments, this information is available from a vehicle data bus, such as a Controller Area Network (CAN) bus in the host vehicle. The vehicle data bus allows multiple vehicle components, sensors, systems, and the like to communicate with one another. In some embodiments, the host vehicle's speed may be included in data transmitted on the vehicle data bus. In particular embodiments, speed detection module 212 may determine the host vehicle's speed based on an analysis of data transmitted on the CAN bus or other vehicle data bus. Although the example of a CAN bus is discussed herein, in other embodiments, any type of bus may be used to communicate data between multiple vehicle components, sensors, systems, and the like. For example, alternate buses and communication protocols include an Ethernet bus and any type of network or bus topology using any type of data communication protocol.

An oncoming vehicle identification module 214 detects one or more oncoming vehicles approaching the host vehicle in an oncoming lane of traffic. In some embodiments, oncoming vehicle identification module 214 identify oncoming vehicles based on data from one or more cameras 110, radar systems 106, and the like. For example, oncoming vehicle identification module 214 can identify oncoming vehicles based solely on data from camera 110 or based solely on data from radar system 106. In other implementations, oncoming vehicle identification module 214 can identify oncoming vehicles based on a fusion of data from both camera 110 and data from radar system 106.

Highway detection module 104 also includes a lateral distance detection module 216 that determines a lateral distance between the host vehicle and an oncoming vehicle. Additional details regarding calculating the lateral distance between the host vehicle and an oncoming vehicle are discussed herein. A proximate vehicle detection module 218 identifies one or more vehicles near the host vehicle (i.e., proximate the host vehicle). As discussed herein, the presence of multiple other vehicles may be considered when determining whether the host vehicle is driving on a highway.

A pedestrian and bicyclist detection module 220 detects pedestrians and/or bicyclists near the host vehicle. For example, pedestrian and bicyclist detection module 220 can detect pedestrians and/or bicyclists based solely on data from camera 110 or based solely on data from radar system 106. In other implementations, pedestrian and bicyclist detection module 220 can detect pedestrians and/or bicyclists based on a fusion of data from both camera 110 and data from radar system 106. As discussed herein, the presence of pedestrians or bicyclists near the host vehicle may be considered when determining whether the host vehicle is driving on a highway.

Highway detection module 104 also includes a highway classification module 222 that classifies the roadway on which the host vehicle is driving. Example classifications include a divided highway, a non-divided highway, not a highway, or unclassified. As discussed herein, the classification of the roadway is based on a variety of data and analysis of that data received from the host vehicle's data bus (e.g., CAN bus or Ethernet bus) or other data sources.

Figure 3:
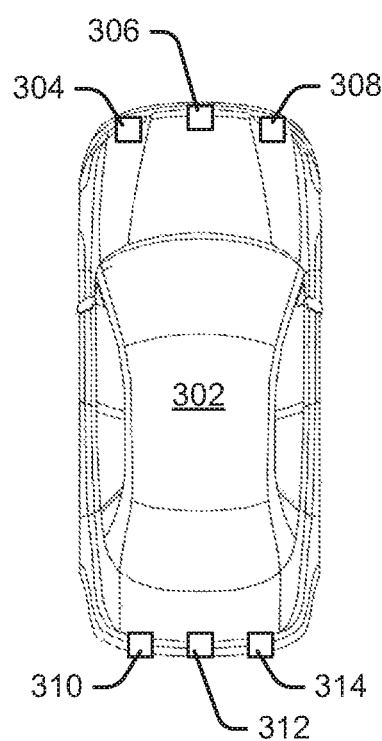
FIG. 3 illustrates an embodiment of a vehicle with multiple sensors mounted to the vehicle.

FIG. 3 illustrates an embodiment of a vehicle 302 (e.g., a host vehicle) with multiple sensors mounted to (or otherwise disposed on) the vehicle. Vehicle 302 includes any number of sensors, such as the various types of sensors discussed herein. In the particular example of FIG. 3, vehicle 302 includes radar sensors 304, 308, 310, and 314, a forward-facing camera 306, and a rear-facing camera 312. Vehicle 302 may have any number of additional sensors (not shown) mounted in multiple vehicle locations. For example, particular embodiments of vehicle 302 may also include other types of sensors such as Lidar sensors and ultrasound sensors. In the example of FIG. 3, sensors 304-314 are mounted near the front and rear of vehicle 302. In alternate embodiments, any number of sensors may be mounted in different locations of the vehicle, such as on the sides of the vehicle, the roof of the vehicle, or any other mounting location.

Figure 4:
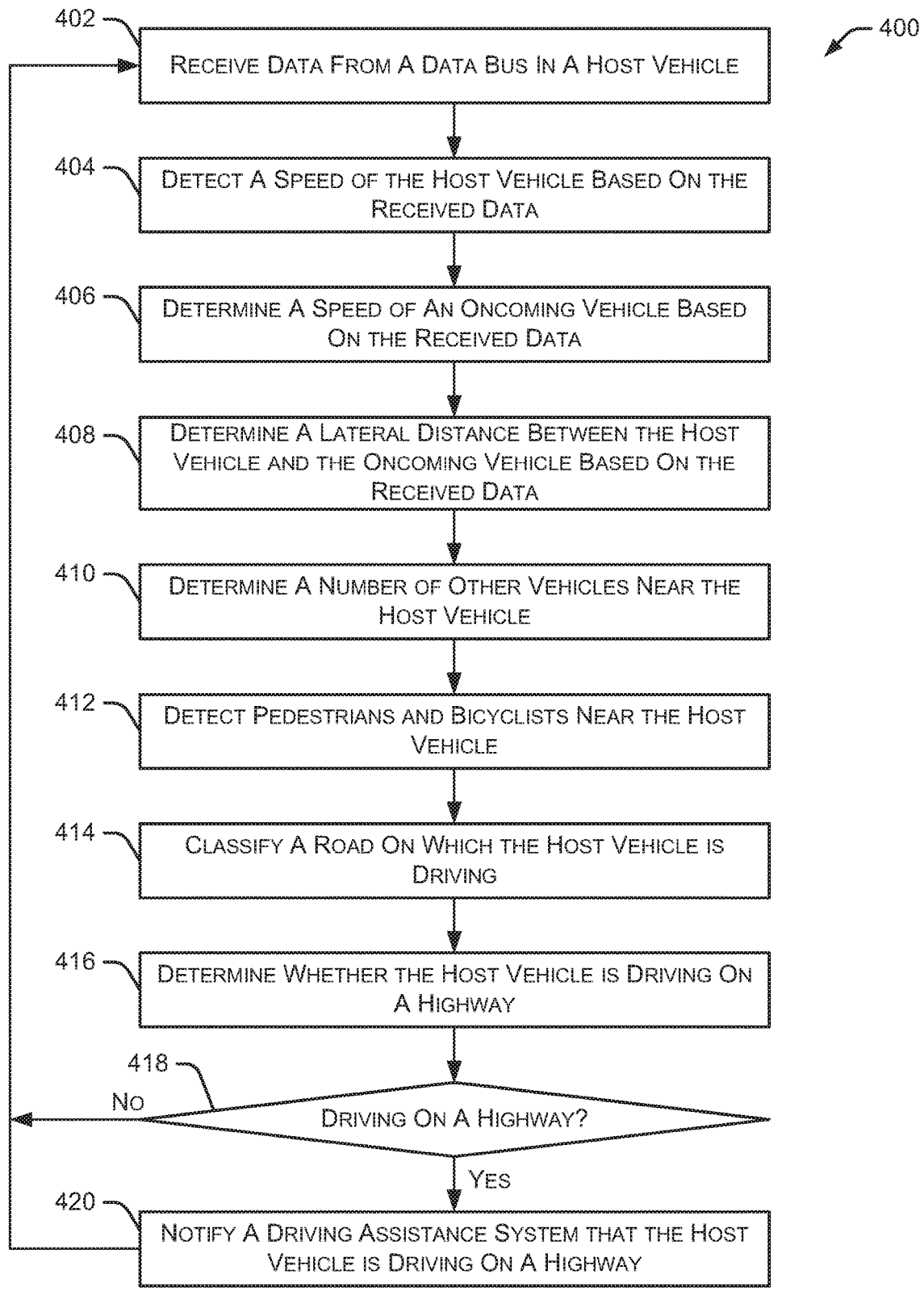
FIG. 4 illustrates an embodiment of a method for determining whether a host vehicle is driving on a highway.

FIG. 4 illustrates an embodiment of a method 400 for determining whether a host vehicle is driving on a highway. Initially, a highway detection system receives 402 data from a data bus (e.g., a CAN bus or Ethernet bus) in a host vehicle. Based on the received data, the highway detection system detects 404 a speed of the host vehicle. In some embodiments, the highway detection system calculates the speed of the host vehicle based on an analysis of the received data.

Method 400 continues as the highway detection system determines 406 a speed of an oncoming vehicle based on the received data. As discussed herein, the speed of the oncoming vehicle can be determined based on camera data and/or radar sensor data received from the host vehicle's data bus. The highway detection system also determines 408 a lateral distance between the host vehicle and the oncoming vehicle based on the received data. Additional details regarding calculating the lateral distance between the host vehicle and the oncoming vehicle are discussed herein.

As method 400 continues, the highway detection system determines 410 a number of other vehicles near the host vehicle and detects 412 pedestrians and bicyclists near the host vehicle. The highway detection system also classifies 414 a road on which the host vehicle is driving. As discussed herein, in some embodiments, the road is classified as a highway (either divided or non-divided) a divided highway, a non-divided highway, not a highway, or unclassified.

After classifying the road, the highway detection system determines 416 whether the host vehicle is driving on a highway. If, at 418, the host vehicle is not driving on a highway, the method returns to 402 and continues receiving data from the data bus in the host vehicle. If, at 418, the host vehicle is driving on a highway, the highway detection system notifies 420 a driving assistance system (or an automated driving system) that the host vehicle is driving on a highway. Based on this information, the driving assistance system (or automated driving system) may determine that a driver of the vehicle may remove their hands from the steering wheel and allow the driving assistance system (or automated driving system) to steer the vehicle.

FIG. 5 illustrates an embodiment of example parameters 500 used to determine whether a vehicle is driving on a highway. In some embodiments, parameters 500 may be referred to as "inference parameters." As shown in FIG. 5, $S^H$ represents a speed of the host vehicle averaged over a particular time period T. The period T can be adjusted based on the computing capabilities of the host vehicle's ECU (Engine Control Unit) or other processing device in the vehicle. In some embodiments, period T is approximately one second. In other embodiments, period T may be greater than or less than one second depending on the computing capabilities of the vehicle's components. The parameter $S^O$ represents a speed of an oncoming vehicle averaged over period T. The parameter $n_v$ represents a number of other vehicles detected near the host vehicle. The parameter $f_p$ represents a flag that is set when a pedestrian or bicyclist (or bicycle) is detected near the host vehicle. The parameter $x_{center}$ represents a lateral distance between the host vehicle and the oncoming vehicle. In some embodiments, $x_{center}$ is calculated from data available on the host vehicle's CAN bus, such as CAN_TX_TRACK_RANGE and CAN_TX_TRACK_ANGLE. For example, $x_{center}$ can be calculated by multiplying: CAN_TX_TRACK_RANGE*cos(CAN_TX_TRACK_ANGLE). If $x_{center}$ is large, the road on which the host vehicle is traveling is considered to be wide and may imply that the road is a highway. Parameters 500 are discussed herein with respect to the process for determining whether a host vehicle is driving on a highway or other type of roadway.

FIG. 6 illustrates an embodiment of example threshold values 600 used to determine whether a vehicle is driving on a highway. For example, if $S^H$ (the speed of the host vehicle) is above a threshold value, the vehicle is likely driving on a highway. In some embodiments, the threshold value for $S^H$ is 50 mph. In alternate embodiments, the threshold value for $S^H$ may have any value greater than or less than 50 mph.

If $S^O$ (the speed of an oncoming vehicle) is above a threshold value, the vehicle is likely to be driving on a highway. In some embodiments, the threshold value for $S^O$ is 50 mph. In alternate embodiments, the threshold value for $S^O$ may have any value greater than or less than 50 mph. If $n_v$ (the number of other vehicles detected near the host vehicle) is above a threshold value, there may be many vehicles on a highway (or roadway) indicating a possible traffic jam. If $x_{center}$ (the lateral distance between the host vehicle and the oncoming vehicle) is above a threshold, the vehicle is likely driving on a highway and, if below the threshold, the vehicle is likely not driving on a highway. In some embodiments, the threshold value for $x_{center}$ is determined based on a typical roadway lane width. For example, in some regions, a typical roadway lane width is 3.7 meters. In these regions, the threshold value for $x_{center}$ is some multiple of 3.7. In alternate embodiments, the threshold value for $x_{center}$ may have any value greater than or less than 3.7 meters. Threshold values 600 are discussed herein with respect to the process for determining whether the host vehicle is driving on a highway or other type of roadway.

Figure 7:
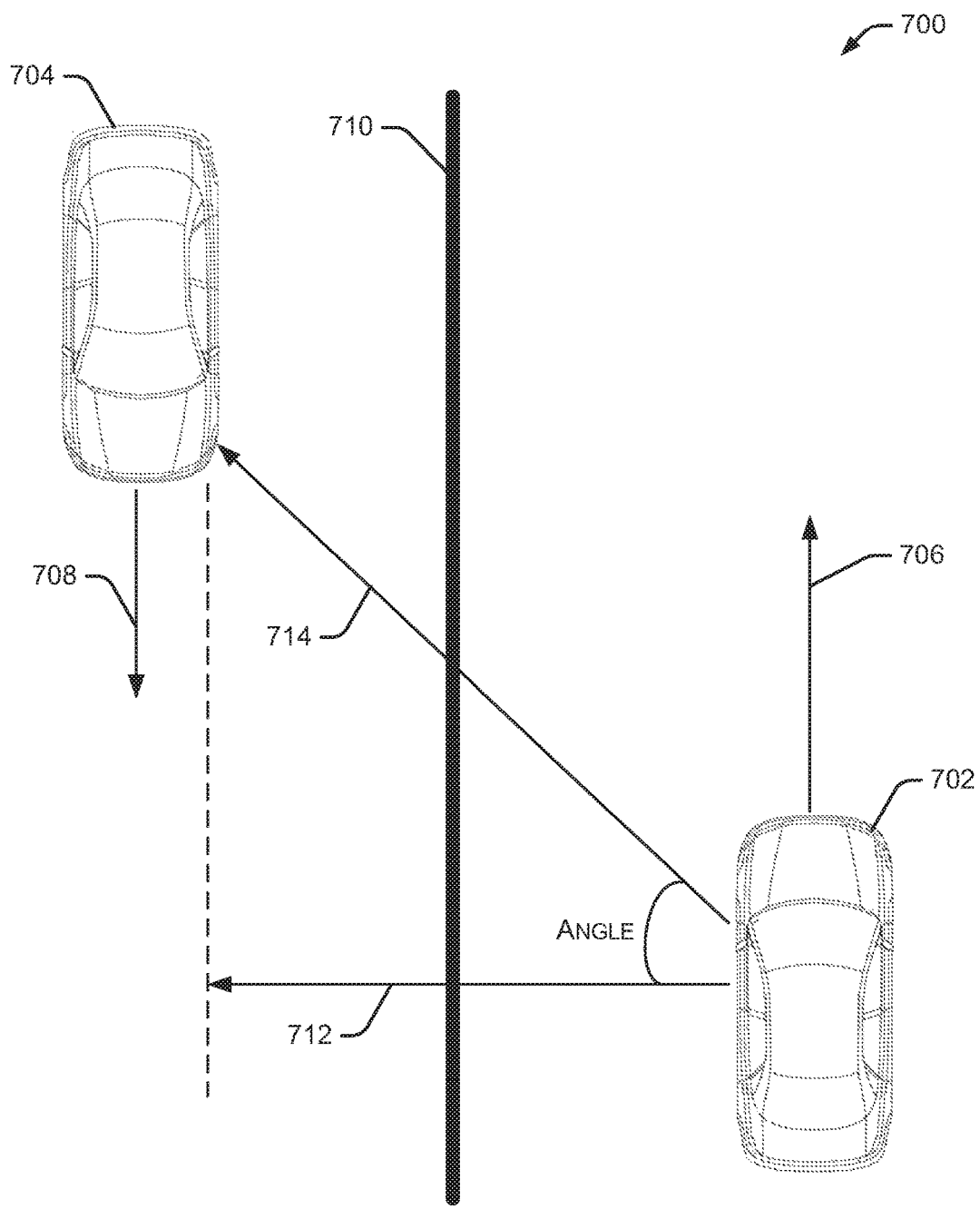
FIG. 7 illustrates an example diagram for determining a lateral distance between a host vehicle and an oncoming vehicle.

FIG. 7 illustrates an example diagram 700 for determining a lateral distance between a host vehicle 702 and an oncoming vehicle 704. As shown in FIG. 7, host vehicle 702 is traveling in a first direction indicated by 706 and oncoming vehicle 704 is traveling in an opposite direction indicated by 708. A divider 710 separates the lane in which host vehicle 702 is driving from the lane in which oncoming vehicle 704 is driving. Divider 710 may be a physical divider (e.g., a barrier, wall, or a guard rail) or a line (or multiple lines) painted on the surface of the roadway. A line 712 indicates the lateral distance between host vehicle 702 and oncoming vehicle 704. Another line 714 helps define the angle between host vehicle 702 and oncoming vehicle 704. The length of line 714 represents the variable CAN_TX_TRACK_RANGE discussed herein. The angular difference between line 712 and 714 represents the variable CAN_TX_TRACK_ANGLE discussed herein. Based on those two variables, the systems and methods described herein can calculate the length of line 712, which represents the lateral distance between host vehicle 702 and oncoming vehicle 704.

Figure 8:
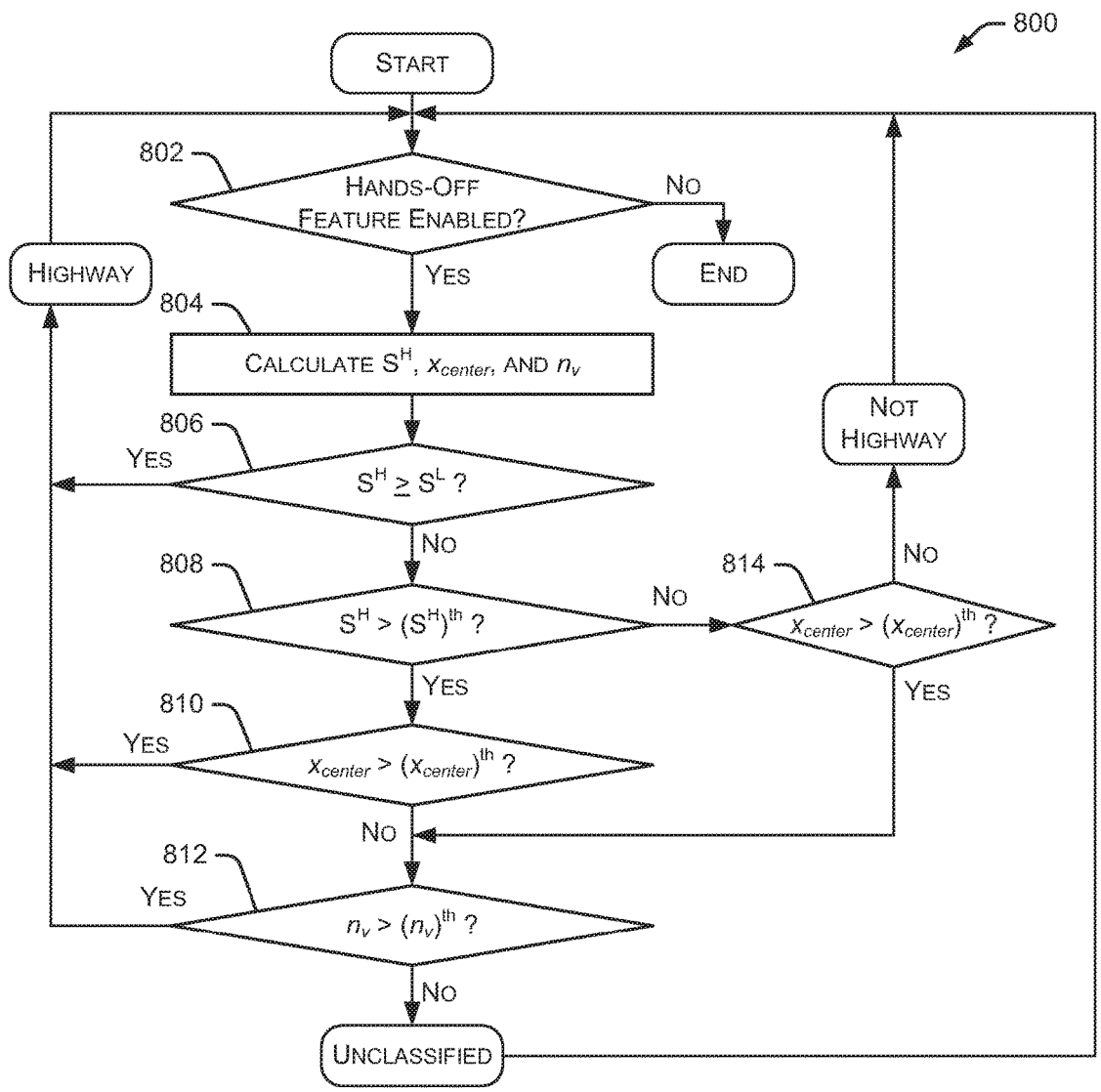
FIG. 8 illustrates an embodiment of a method for classifying the type of road on which the host vehicle is driving.

FIG. 8 illustrates an embodiment of a method 800 for classifying the type of road on which the host vehicle is driving. Initially, method 800 determines 802 whether a hands-off feature is enabled. For example, the hands-off feature may allow a driver to take their hands off from the steering wheel in certain situations and let an automated driving (or driving assistance system) control the steering of the vehicle. If the hands-off feature is enabled, the method calculates values for $S^H$, $x_{center}$, and $n_v$ as discussed herein.

Method 800 continues by determining 806 whether $S^H$ is greater than or equal to $S^L$, where $S^L$ is a typical speed limit for a highway. If $S^H$ equals or exceeds a typical highway speed limit, then the method determines that the vehicle is driving on a highway. If not, the method continues to determine 808 whether $S^H$ exceeds a threshold value. If $S^H$ exceeds the threshold value, the method continues to 810 to determine whether the lateral distance between the host vehicle and an oncoming vehicle exceeds a threshold value. If so, the vehicle is determined to be driving on a highway. If the lateral distance between the host vehicle and the oncoming vehicle at 810 does not exceed the threshold value, method 800 determines 812 whether the number of vehicles near the host vehicle exceeds a threshold value. If so, the method determines that the host vehicle is driving on a highway.

Returning to 808, if $S^H$ does not exceed the threshold value, the method continues to 814 to determine whether the lateral distance between the host vehicle and an oncoming vehicle exceeds a threshold value. If so, the method continues to 812, discussed above. If the lateral distance between the host vehicle and an oncoming vehicle does not exceed the threshold value, the method determines that the vehicle is not driving on a highway.

The example of FIG. 8 considers certain parameters in determining whether the host vehicle is driving on a highway. In other embodiments, any combination of parameters may be used to determine whether the host vehicle is driving on a highway or other type of roadway.

As discussed herein, certain parameters may have an associated threshold value. In some embodiments, parameters may have multiple threshold values. For example, $x_{center}$ may have three thresholds: an upper threshold, a middle threshold, and a lower threshold. If $x_{center}$ is greater than the upper threshold, the radar system or camera system likely detected an adjacent road and does not imply that the host vehicle is driving on a highway. If the value of $x_{center}$ is between the upper and middle thresholds, it may indicate that the host vehicle is driving on a divided highway. And, if the value of $x_{center}$ is between the middle and lower thresholds, it may indicate that the host vehicle is driving on a non-divided highway. Finally, if the value of $x_{center}$ is less than the lower threshold, it may indicate that the host vehicle is not driving on a highway.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
receiving received data from a vehicle data bus in a first vehicle, the received data including data from at least one of a camera and a radar sensor;
detecting a speed of the first vehicle based on the received data;
determining a speed of an oncoming vehicle based on the received data;
determining a lateral distance between the first vehicle and the oncoming vehicle based on the received data; and
determining, by one or more processors, whether the first vehicle is driving on a highway.

2. The method of claim 1, wherein determining whether the first vehicle is driving on a highway is based on the speed of the first vehicle, the speed of the oncoming vehicle, and the lateral distance between the first vehicle and the oncoming vehicle.

3. The method of claim 1, further comprising determining a number of other vehicles near the first vehicle.

4. The method of claim 3, wherein determining whether the first vehicle is driving on a highway is based on the speed of the first vehicle, the speed of the oncoming vehicle, the lateral distance between the first vehicle and the oncoming vehicle, and the number of other vehicles near the first vehicle.

5. The method of claim 1, further comprising determining whether any pedestrians or bicyclists are near the first vehicle.

6. The method of claim 5, wherein determining whether the first vehicle is driving on a highway is based on the speed of the first vehicle, the speed of the oncoming vehicle, the lateral distance between the first vehicle and the oncoming vehicle, and whether any pedestrians or bicyclists are near the first vehicle.

7. The method of claim 1, further comprising classifying a road on which the first vehicle is driving based on the speed of the first vehicle, the speed of the oncoming vehicle, and the lateral distance between the first vehicle and the oncoming vehicle.

8. The method of claim 7, wherein classifying the road includes assigning a classification of a divided highway, a non-divided highway, not a highway, or unclassified.

9. The method of claim 1, further comprising notifying a driving assistance system in the first vehicle whether the first vehicle is driving on a highway.

10. The method of claim 1, wherein the vehicle data bus is a Controller Area Network (CAN) bus that allows a plurality of vehicle components to communicate with one another.

11. The method of claim 2, further comprising:
determining a distance to the oncoming vehicle and an angle to the oncoming vehicle based on the received data;
determining the lateral distance between the first vehicle and the oncoming vehicle based on the distance and the angle; and
determining, by one or more processors, that the first vehicle is driving on a highway in response to the speed of the oncoming vehicle being above a speed threshold and the lateral distance being greater than a distance threshold.

12. A method comprising:
receiving data associated with a first vehicle;
detecting a speed of the first vehicle based on the received data;
determining, using one or more processors, a lateral distance between the first vehicle and an oncoming vehicle based on the received data;
determining, using the one or more processors, a number of other vehicles near the first vehicle; and
determining, using the one or more processors, whether the first vehicle is driving on a highway based on the speed of the first vehicle, the lateral distance between the first vehicle and the oncoming vehicle, and the number of other vehicles near the first vehicle.

13. The method of claim 12, wherein receiving data associated with the first vehicle includes receiving data from a vehicle data bus in the first vehicle.

14. The method of claim 13, wherein the vehicle data bus is a Controller Area Network (CAN) bus that allows a plurality of vehicle components to communicate with one another.

15. The method of claim 12, further comprising determining whether any pedestrians or bicyclists are near the first vehicle.

16. The method of claim 15, wherein determining whether the first vehicle is driving on a highway is further based on whether any pedestrians or bicyclists are near the first vehicle.

17. The method of claim 12, further comprising notifying a driving assistance system in the first vehicle whether the first vehicle is driving on a highway.

18. An apparatus comprising:
a communication manager configured to receive data from a vehicle data bus in a first vehicle, the data being sensor data from a speed sensor of the first vehicle and at least one of a camera and a radar sensor;
a speed detection module configured to detect a speed of the first vehicle based on the received data;
an lateral distance detection module configured to determine a lateral distance between the first vehicle and an oncoming vehicle based on the received data; and a highway classification module configured to determine whether the first vehicle is performing highway driving based on the speed of the first vehicle and the lateral distance between the first vehicle and the oncoming vehicle, wherein the highway classification module is programmed to:

if the speed of the first vehicle meets a host vehicle threshold, determine that the first vehicle is performing highway driving;

if the speed of the vehicle does not meet the host vehicle threshold and the lateral distance meets a lateral distance threshold, determine that the first vehicle is performing highway driving.

19. The apparatus of claim 18, further comprising a proximate vehicle detection module configured to determine a number of other vehicles near the first vehicle;

wherein the highway classification module is further programmed to:

if the speed of the first vehicle does not meet the host vehicle threshold, the lateral distance does not meet the lateral distance threshold, and the number of other vehicles meets a number threshold, determine that the first vehicle is performing highway driving.

20. The apparatus of claim 18, further comprising a pedestrian and bicyclist detection module configured to determine whether any pedestrians or bicyclists are near the first vehicle.

* * * * *